United States Patent
Choi et al.

(10) Patent No.: US 7,418,042 B2
(45) Date of Patent: Aug. 26, 2008

(54) REPETITION CODING FOR A WIRELESS SYSTEM

(75) Inventors: Won-Joon Choi, Sunnyvale, CA (US); Qinfang Sun, Cupertino, CA (US); Jeffrey M. Gilbert, Sunnyvale, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 666 days.

(21) Appl. No.: 10/666,952

(22) Filed: Sep. 17, 2003

(65) Prior Publication Data

US 2005/0243774 A1    Nov. 3, 2005

(51) Int. Cl.
*H04K 1/10* (2006.01)
*H04L 27/28* (2006.01)

(52) U.S. Cl. .......... 375/260; 375/262; 375/265; 375/341; 375/349

(58) Field of Classification Search ........ 375/130, 375/140, 141, 145, 259, 260, 261, 262, 265, 375/295, 316, 340, 341, 326, 327, 349; 714/699, 714/746, 786, 794, 795
See application file for complete search history.

(56) References Cited

U.S. PATENT DOCUMENTS

| | | | | |
|---|---|---|---|---|
| 5,148,278 A | * | 9/1992 | Wischermann | 348/609 |
| 5,822,359 A | * | 10/1998 | Bruckert et al. | 375/145 |
| 5,946,356 A | | 8/1999 | Felix et al. | |
| 5,953,377 A | * | 9/1999 | Yoshida | 375/295 |
| 5,983,382 A | * | 11/1999 | Pauls | 714/744 |
| 6,128,276 A | * | 10/2000 | Agee | 370/208 |
| 6,148,042 A | * | 11/2000 | Zehavi et al. | 375/340 |
| 6,186,717 B1 | * | 2/2001 | Kaiser et al. | 375/148 |
| 6,473,467 B1 | * | 10/2002 | Wallace et al. | 375/267 |
| 6,976,202 B1 | * | 12/2005 | Rezvani et al. | 714/752 |
| 7,002,900 B2 | * | 2/2006 | Walton et al. | 370/208 |
| 7,095,709 B2 | * | 8/2006 | Walton et al. | 370/208 |
| 7,203,261 B2 | * | 4/2007 | Gupta | 375/376 |
| 2001/0034871 A1 | * | 10/2001 | Takeda et al. | 714/781 |
| 2002/0183027 A1 | | 12/2002 | Husted et al. | 455/219 |
| 2003/0058966 A1 | | 3/2003 | Gilbert et al. | 375/326 |
| 2004/0100898 A1 | * | 5/2004 | Anim-Appiah et al. | 370/210 |
| 2004/0240486 A1 | | 12/2004 | Venkatesh et al. | |
| 2005/0013238 A1 | * | 1/2005 | Hansen | 370/203 |

OTHER PUBLICATIONS

U.S. Appl. No. 10/263,415, filed Oct. 1, 2002, Sun et al.

* cited by examiner

*Primary Examiner*—Phuong Phu
(74) *Attorney, Agent, or Firm*—Van Pelt, Yi & James LLP

(57) ABSTRACT

Data is transmitted over a wireless channel. Convolutionally encoded data is received and the data is repetition encoding where a repetition rate associated with the repetition encoding is set to one of a plurality of possible rates. In some embodiments, data is repeated in the frequency domain. In some embodiments, data is repeated in the time domain.

24 Claims, 5 Drawing Sheets

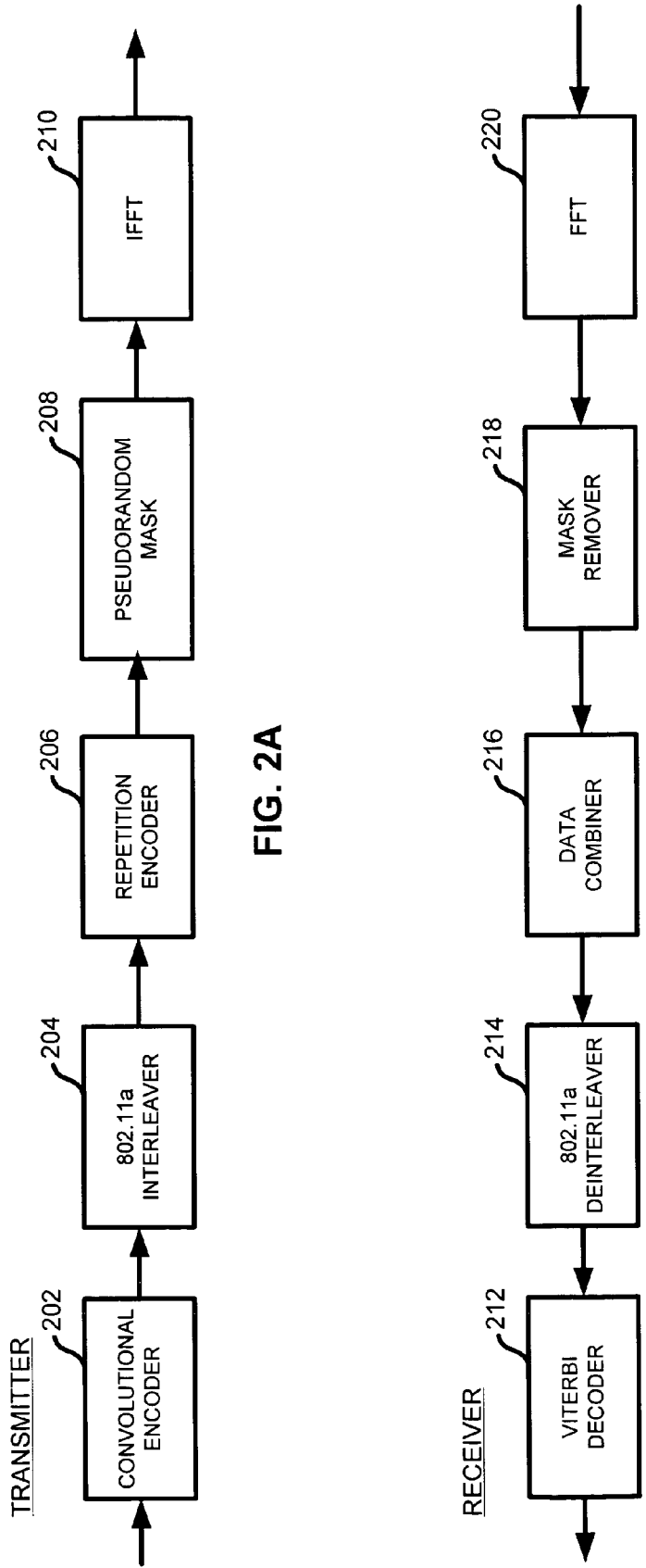

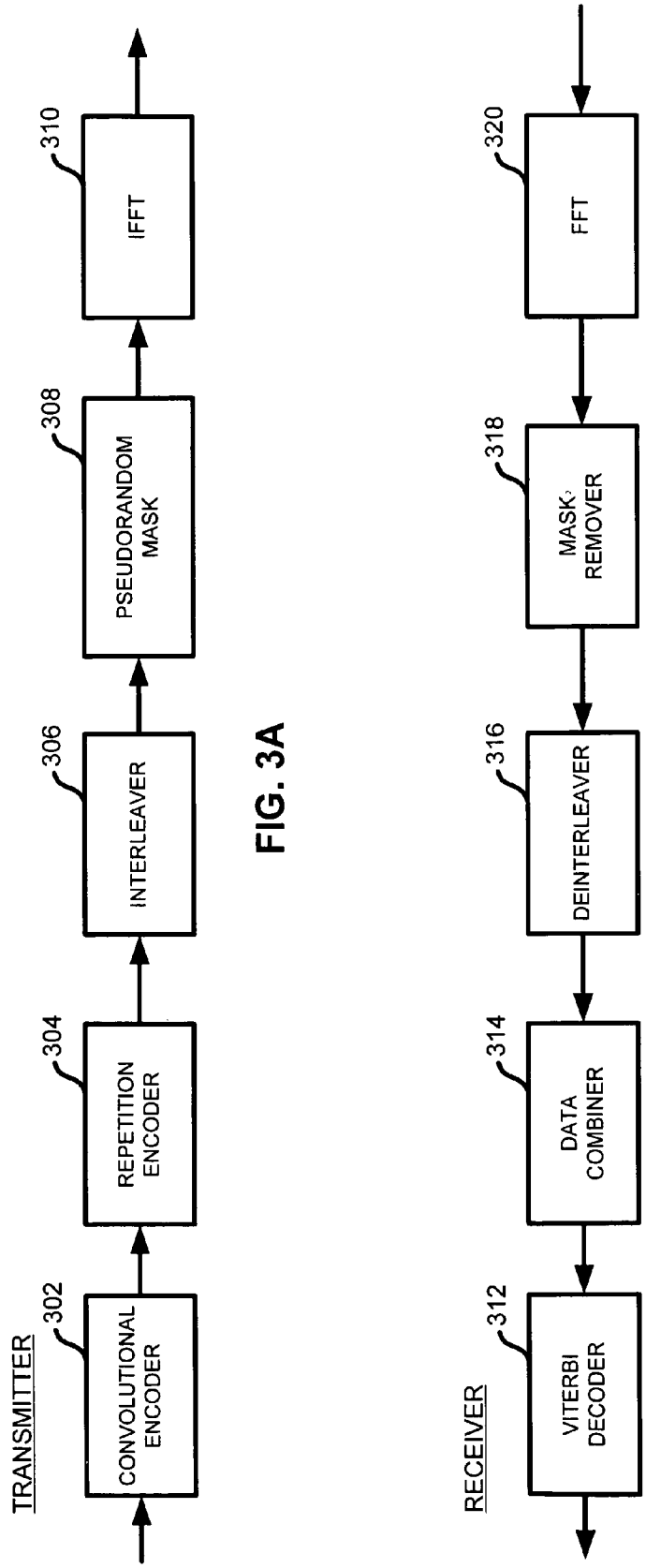

WRITE IN ↓

| 1 | 7 | 13 | 19 | 25 | 31 | 37 | 43 |
|---|---|---|---|---|---|---|---|
| 2 | 8 | 14 | 20 | 26 | 32 | 38 | 44 |
| 3 | 9 | 15 | 21 | 27 | 33 | 39 | 45 |
| 4 | 10 | 16 | 22 | 28 | 34 | 40 | 46 |
| 5 | 11 | 17 | 23 | 29 | 35 | 41 | 47 |
| 6 | 12 | 18 | 24 | 30 | 36 | 42 | 48 |

FIG. 4A

| 1 | 19 | 37 | 7 | 25 | 43 | 13 | 31 |
|---|----|----|---|----|----|----|----|
| 2 | 20 | 38 | 8 | 26 | 44 | 14 | 32 |
| 3 | 21 | 39 | 9 | 27 | 45 | 15 | 33 |
| 4 | 22 | 40 | 10 | 28 | 46 | 16 | 34 |
| 5 | 23 | 41 | 11 | 29 | 47 | 17 | 35 |
| 6 | 24 | 42 | 12 | 30 | 48 | 18 | 36 |

FIG. 4B

READ OUT ⟶

| 1 | 19 | 37 | 7 | 25 | 43 | 13 | 31 |
|---|----|----|---|----|----|----|----|
| 2 | 20 | 38 | 8 | 26 | 44 | 14 | 32 |
| 3 | 21 | 39 | 9 | 27 | 45 | 15 | 33 |
| 4 | 22 | 40 | 10 | 28 | 46 | 16 | 34 |
| 5 | 23 | 41 | 11 | 29 | 47 | 17 | 35 |
| 6 | 24 | 42 | 12 | 30 | 48 | 18 | 36 |

FIG. 4C

REPETITION CODING FOR A WIRELESS SYSTEM

FIELD OF THE INVENTION

The present invention relates generally to a data transmission scheme for a wireless communication system. More specifically, a repetition coding scheme for a wireless system is disclosed.

BACKGROUND OF THE INVENTION

The IEEE 802.11a, 802.11b, and 802.11g standards, which are hereby incorporated by reference, specify wireless communications systems in bands at 2.4 GHz and 5 GHz. The combination of the 802.11a and 802.11g standards, written as the 802.11a/g standard, will be referred to repeatedly herein for the purpose of example. It should be noted that the techniques described are also applicable to the 802.11b standard where appropriate. It would be useful if alternate systems could be developed for communication over an extended range or in noisy environments. Such communication is collectively referred to herein as extended range communication. The IEEE 802.11a/g standard specifies a robust data encoding scheme that includes error correction. However, for extended range communication, a more robust data transmission scheme at reduced data rates is required.

BRIEF DESCRIPTION OF THE DRAWINGS

The present invention will be readily understood by the following detailed description in conjunction with the accompanying drawings, wherein like reference numerals designate like structural elements, and in which:

FIG. 2A is a diagram illustrating a transmitter system with a repetition encoder placed after the output of an interleaver such as the one specified in the IEEE 802.11a/g specification.

FIG. 2B is a diagram illustrating a receiver system for receiving a signal transmitted by the transmitter system depicted in FIG. 2A.

FIG. 3A is a diagram illustrating a transmitter system with a repetition encoder placed before the input of an interleaver designed to handle repetition coded bits such as the one described below FIG. 3B is a diagram illustrating a receiver system for receiving a signal transmitted by the transmitter system depicted in FIG. 3A.

FIGS. 4A-4C are tables illustrating an interleaver.

DETAILED DESCRIPTION

Figure 1A:
FIG. 1A is a diagram illustrating the data portion of a regular 802.11a/g OFDM packet.

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

In a typical system as described below, bits representing a set of data that is to be communicated are convolutionally encoded or otherwise transformed into values. Various types of modulation may be used such as BPSK, QPSK, 16QAM or 32QAM. In the case of BPSK, which is described further herein, each BPSK symbol may have one of two values and each BPSK symbol corresponds to one bit. An OFDM symbol includes 48 values that are transmitted on different subchannels. To provide extended range, each value that is sent is repeated several times by the transmitter. In one embodiment, the bits are convolutionally encoded using the same encoding scheme as the encoding scheme specified for the IEEE 802.11a/g standard. Each encoded value is repeated and transmitted. Preferably, the values are repeated in the frequency domain, but the values may also be repeated in the time domain. In some embodiments, the repetition coding is implemented before interleaving and a specially designed interleaver is used to handle repeated values. In addition, a pseudorandom code may be superimposed on the OFDM symbols to lower the peak to average ratio of the transmitted signal.

The receiver combines each of the signals that correspond to the repetition coded values and then uses the combined signal to recover the values. In embodiments where the values are combined in the frequency domain, the signals are combined coherently with correction made for different subchannel transfer functions and phase shift errors. For the purpose of this description and the claims, "coherently" combining should not be interpreted to mean that the signals are perfectly coherently combined, but only that some phase correction is implemented. The signals from different subchannels are weighted according to the quality of each subchannel. A combined subchannel weighting is provided to a Viterbi detector to facilitate the determination of the most likely transmitted sequence.

Using the modulation and encoding scheme incorporated in the IEEE 802.11a/g standard, the required signal to noise ratio decreases linearly with data rate assuming the same modulation technique and base code rate are not changed and repetition coding is used. Some further gains could be achieved through the use of a better code or outer code. However, in a dual mode system that is capable of implementing both the IEEE 802.11a/g standard and an extended range mode, the complexity introduced by those techniques may not be worth the limited gains that could be achieved. Implementing repetition of values is in comparison simpler and more efficient in many cases.

The repetition code can be implemented either in the time domain or in the frequency domain. For time domain repetition, the OFDM symbols in the time domain (after the IFFT operation) are repeated a desired number of times, depending on the data rate. This scheme has an advantage in efficiency since just one guard interval is required for r-repeated OFDM symbols in the time domain.

Figure 1B:
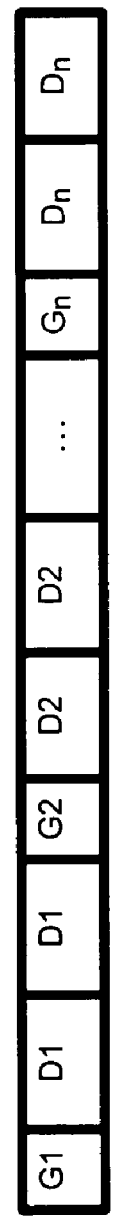
FIG. 1B is a diagram illustrating the data portion of a modified 802.11a/g OFDM packet where each symbol is repeated twice (r=2).

FIG. 1A is a diagram illustrating the data portion of a regular 802.11 a/g OFDM packet. Each OFDM symbol 104 is separated by a guard band 102. FIG. 1B is a diagram illustrating the data portion of a modified 802.11 a/g OFDM packet where each symbol is repeated twice (r=2). Each set of repeated symbols 112 is separated by a single guard band 104. There is no need for a guard band between the repeated symbols.

The OFDM symbols can also be repeated in the frequency domain (before the IFFT). The disadvantage of this scheme is that one guard interval has to be inserted between every OFDM symbol in the time-domain since the OFDM symbols with frequency-domain repetition are not periodic. However, repetition in the frequency domain can achieve better multipath performance if the repetition pattern is configured in the frequency-domain to achieve frequency diversity.

In a typical environment where signals are reflected one or more times between the transmitter and the receiver, it is possible that certain reflections and direct signals will tend to cancel out at the receiver because the phase difference between the paths could be close to 180 degrees. For different frequencies, the phase difference between the paths will be different and so spreading the repeated values among different frequencies to achieve frequency diversity ensures that at least some of the values will arrive at the receiver with sufficient signal strength to be combined and read. To maximize the benefit of frequency diversity, it is preferable to repeat values across subchannels that are as widely spaced as is practicable, since the phase difference between adjacent subchannels is small.

FIG. 2A is a diagram illustrating a transmitter system with a repetition encoder placed after the output of an interleaver such as the one specified in the IEEE 802.11a/g specification. In this example system, BPSK modulation is implemented and the repetition encoder and the interleaver are described as operating on bits, which is equivalent to operating on the corresponding values. In other embodiments, other modulation schemes may be used and values may be repeated and interleaved. The interleaver is included in the IEEE 802.11a/g transmitter specification for the purpose of changing the order of the bits sent to remove correlation among consecutive bits introduced by the convolutional encoder. Incoming data is convolutionally encoded by convolutional encoder 202. The output of convolutional encoder 202 is interleaved by IEEE 802.11a/g interleaver 204. Repetition encoder 206 repeats the bits and pseudorandom mask combiner 208 combines the output of repetition encoder 206 with a pseudorandom mask for the purpose of reducing the peak to average ratio of the signal, as is described below. The signal is then processed by IFFT processor 210 before being transmitted.

FIG. 2B is a diagram illustrating a receiver system for receiving a signal transmitted by the transmitter system depicted in FIG. 2A. The received signal is processed by FFT processor 220. The output of FFT processor 220 is input to mask remover 218 which removes the pseudorandom mask. Data combiner 216 combines the repetition encoded data into a stream of nonrepetitive data. The operation of data combiner 216 is described in further detail below. IEEE 802.11a/g deinterleaver 214 deinterleaves the data and Viterbi decoder 212 determines the most likely sequence of data that was input to the transmission system originally.

The system depicted in FIGS. 2A and 2B can use the same interleaver and deinterleaver as the regular 802.11a/g system, and also has flexibility in designing the repetition pattern since the repetition coder is placed right before the IFFT block. However, it has certain disadvantages. Data padding is required at the transmitter and data buffering is required at the receiver. Bits have to be padded according to the number of bytes to be sent and the data rate. The number of padded bits is determined by how many bits one OFDM symbol can carry. Since the 802.11a/g interleaver works with 48 coded bits for BPSK modulation, bits need to be padded to make the number of coded bits a multiple of 48. Since the repetition coder is placed after the interleaver, it may be necessary to pad the data by adding unnecessary bits for lower data rates than 6 Mbps.

For example, one OFDM symbol would carry exactly 1 uncoded repeated bit at a data rate of ¼ Mbps. Since the OFDM symbol could be generated from that one bit, there would never be a need to add extra uncoded bits and so padding would not be necessary in principle. However, due to the special structure of the 802.11a/g interleaver, several bits would need to be padded to make the number of coded bits a multiple of 48 before the interleaver. The padded bits convey no information and add to the overhead of the transmission, making it more inefficient.

On the other hand, if the repetition encoder is placed after the interleaver, the repetition coded bits generated from the 48 interleaved bits are distributed over multiple OFDM symbols. Therefore, the receiver would need to process the multiple OFDM symbols before deinterleaving the data could be performed. Therefore, additional buffers would be necessary to store frequency-domain data.

The system can be improved and the need for data padding at the transmitter and data buffering at the receiver can be eliminated by redesigning the interleaver so that it operates on bits output from the repetition encoder.

FIG. 3A is a diagram illustrating a transmitter system with a repetition encoder placed before the input of an interleaver designed to handle repetition coded bits such as the one described below. Incoming data is convolutionally encoded by convolutional encoder 302. The output of convolutional encoder 302 is repetition coded by repetition encoder 304. Interleaver 306 interleaves the repetition coded bits. Interleaver 306 is designed so that data padding is not required and so that for lower repetition levels, the bits are interleaved so as to separate repeated bits. Pseudorandom mask combiner 308 combines the output of Interleaver 306 with a pseudorandom mask for the purpose of reducing the peak to average ratio of the signal, as is described below. The signal is then processed by IFFT processor 310 before being transmitted.

FIG. 3B is a diagram illustrating a receiver system for receiving a signal transmitted by the transmitter system depicted in FIG. 3A. The received signal is processed by FFT processor 320. The output of FFT processor 320 is input to mask remover 318 which removes the pseudorandom mask. Deinterleaver 316 deinterleaves the data. Data combiner 314 combines the repetition encoded data into a stream of nonrepetitive data. The operation of data combiner 314 is described in further detail below. Viterbi decoder 312 determines the most likely sequence of data that was input to the transmission system originally.

Interleaver 306 is preferably designed such that the same (repeated) data are transmitted well separated in the frequency domain to achieve full frequency diversity. For example, a repetition pattern in the frequency domain for in 1 Mbps mode in one embodiment would repeat each bit 6 times. Denoting data in the frequency domain as $d_1, d_2, \ldots, d_8$, the repeated sequence of data is given by:

$$d_1 d_1 d_1 d_1 d_1 d_1 d_2 d_2 d_2 d_2 d_2 d_2 \ldots d_8 d_8 d_8 d_8 d_8 d_8$$

The same data are placed in a group fashion because it is easy to combine those data at the receiver. Note that the repeated data can be combined only after r (6 in this example) data are available.

The repetition pattern in the above example does not provide the greatest possible frequency diversity since the spacing between the same data transmitted on adjacent subchannels may not be large enough and the subchannels corresponding to the same data are not completely independent. Greater frequency diversity would be desirable especially for multipath channels with large delay spreads. Interleaver 306, therefore, is designed to spread the repeated data in the frequency domain to achieve frequency diversity as much as is practical.

In one embodiment, the interleaver is designed to optimize the frequency diversity provided by the interleaver for data rates faster than 1 Mbps (repetition number<=6). For lower data rates ½ and ¼ Mbps, there is enough repetition that sufficient subchannels are covered to provide frequency diversity even if adjacent subchannels are used. In the preferred interleaver described below, repeated bits are separated at least by 8 subchannels and consecutive coded bits from the convolutional encoder are separated at least by 3 subchannels. The interleaver is designed according to the following steps:

1. A 6×8 table is generated as shown in FIG. 4A to satisfy the first rule which specifies that bits are separated at least by 8 subchannels.
2. As shown in FIG. 4B, the columns are swapped to meet the second rule which specifies that consecutive coded bits are separated at least by 3 subchannels.
3. As shown in FIG. 4C, separation between repeated bits is increased by swapping rows. In the example shown, repeated bits are separated by at least 16 bins for 3 Mbps (Repetition number=2 for 3 Mbps so each bit is repeated once.)

For the example interleaver shown, if the input to the interleaver is {1, 2, 3, ..., 48}, then the output would be: {1, 19, 37, 7, 25, 43, 13, 31, 4, 22, 40, 10, 28, 46, 16, 34, 2, 20, 38, 8, 26, 44, 14, 32, 5, 23, 41, 11, 29, 47, 17, 35, 3, 21, 39, 9, 27, 45, 15, 33, 6, 24, 42, 12, 30, 48, 18, 36}.

Repetition of the values in the frequency domain tends to generate a peak in the time domain, especially for very low data rates (i.e., for large repetition numbers). The large peak-to-average ratio (PAR) causes problems for the system, especially the transmit power amplifier. This problem can be ameliorated by scrambling or masking the values transmitted on different frequencies so that they are not all the same. As long as the masking scheme is known, the scrambling can be undone at the receiver. In one embodiment, the frequency-domain data is multiplied by the long symbol of 802.11a/g, which was carefully designed in terms of PAR. As can be seen in FIG. 2, the mask operation is performed right before the IFFT operation. In general, any masking sequence can be used that causes repeated values to differ enough that the PAR is suitably reduced. For example, a pseudorandom code is used in some embodiments.

At the receiver, decoding includes: (1) mask removal, (2) deinterleaving, (3) data combining, (4) channel correction, (5) Viterbi decoding. It should be noted that in some embodiments, the order of the steps may be changed as is appropriate.

In embodiments using frequency repetition, the transmitter preferably masks the frequency-domain signal to reduce the peak-to-average ratio (PAR) in the time-domain. The receiver removes the mask imposed by the transmitter. If, as in the example above, the mask used by the transmitter consists of +/−1 s, then the mask is removed by changing the signs of the FFT outputs in the receiver. After the mask is removed, the data is deinterleaved according to the interleaving pattern at the transmitter.

The repeated signal is combined in the frequency domain at the receiver to increase the SNR of the repeated signal over the SNR had the signal not been repeated. The SNR is increased by multiplying the complex conjugate of the channel response as follows.

$$Y_c = \sum_{j \in S_c} H_j^* Y_j$$

$$H_c = \sum_{j \in S_c} |H_j|^2$$

where $Y_j$ is the signal in subchannel j, $H_j$ is the response of subchannel j, $Y_c$ is the combined signal, $H_c$ is the combined channel, and $S_c$ is the set of indices corresponding to the frequency subchannels that contain the same data.

The channel effect is preferably removed before the data is input to the Viterbi decoder so that the Viterbi decoder is able to use the same soft decision unit regardless of the actual channel response. In the extended-range mode, the combined channel is used in the channel correction unit.

The frequency-domain signals are weighted for calculating the path-metrics in the soft-decision Viterbi decoder, and the optimal weights are determined by the corresponding SNR.

The resulting SNR for the combined signal becomes:

$$SNR = \sum_{j \in S_c} |H_j|^2 \frac{E_x}{\sigma_j^2}$$

where $E_x$ is the signal power, and $\sigma_j^2$ is the noise power for the subchannel j. The combined SNR is used to evaluate the Viterbi weights.

The 802.11a/g standard specifies that there are four pilot signals included in each OFDM symbol for the purpose of estimating timing offset and frequency offset and tracking phase noise in 802.11a/g signals. The 802.11a/g system assumes that these 4 pilots are reliable enough to estimate the phase information. That assumption may not be true for a system with a very low SNR. The redundancy that exists in the frequency-domain signal is exploited to help the pilots to estimate and track phase.

The phase information is estimated from the frequency domain data as follows:

1. The repeated signals are combined in the frequency domain to increase the SNR, with a channel estimate determined from a preamble sequence of long symbols and an estimated slope, which captures the effect of timing offset.
2. Hard decisions are made for each of the combined signals after removing the phase offset estimated from the previous symbol.
3. The combined signals are multiplied by their own hard decisions. The average of the hard-decision corrected signal is used to evaluate an angle to estimate the phase offset for the current symbol.

A filter is applied to the estimated phase offset to reduce the effect of noise. In one embodiment, a nonlinear median filter is used. The nonlinear median filter effectively detects and corrects an abrupt change in the phase offset, which could be caused by hard decision errors.

An encoding and decoding scheme for a wireless system has been disclosed. Preferably, repetition coding in the frequency domain is used. An interleaver that provides frequency diversity has been described. In various embodiments, the described techniques may be combined or used separately according to specific system requirements.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of transmitting data over a wireless channel comprising:
    convolutionally encoding data to be transmitted over the wireless channel;
    repetition encoding the convolutionally encoded data, wherein repetition encoding is performed in the frequency domain prior to processing by an Inverse Fast Fourier Transform (IFFT);
    masking the repetition encoded data using a long symbol associated with IEEE 802.11 IEEE 802.11 standard a or IEEE 802.11 standard g;
    processing the masked data using the IFFT, wherein frequency domain information is transformed into time domain information; and
    transmitting the time domain information over the wireless channel.

2. A method of transmitting data over a wireless channel as recited in claim 1 further including masking the data to reduce its peak to average ratio.

3. A method of transmitting data over a wireless channel as recited in claim 1 further including masking the data by applying a pseudorandom sequence.

4. A method of transmitting data over a wireless channel as recited in claim 1 wherein the data is encoded using an IEEE 802.11 standard a or IEEE 802.11 standard g encoder.

5. A method of transmitting data over a wireless channel as recited in claim 1 wherein the data is interleaved after repetition encoding whereby a need to pad the data prior to interleaving is reduced.

6. A method of receiving data over a wireless channel comprising: receiving masked, convolutionally encoded, and repetition encoded data via the wireless channel;
    unmasking the received masked, convolutionally encoded, and repetition encoded data using a long symbol associated with IEEE 802.11 IEEE 802.11 standard a or IEEE 802.11 standard g:
    processing the unmasked data using a Fast Fourier Transform (FFT), wherein time domain information is transformed into frequency domain information;
    combining the repetition encoded data to produce combined data, wherein combining is performed in the time domain after processing by the FFT; and
    decoding the combined data.

7. A method of receiving data over a wireless channel as recited in claim 6 wherein the combined data is decoded using a Viterbi decoder.

8. A method of receiving data over a wireless channel as recited in claim 6 wherein the received data is further encoded by a pseudorandom mask, further including removing the pseudorandom mask.

9. A method of receiving data over a wireless channel as recited in claim 6 wherein the convolutional encoding conforms to the IEEE 802.11 standard a or IEEE 802.11 standard g convolutional encoding.

10. A method of receiving data over a wireless channel as recited in claim 6 further including deinterleaving the data before combining the data.

11. A method of receiving data over a wireless channel as recited in claim 6 wherein the repetition encoded data is repeated in the frequency domain on subchannels, and wherein combining the repetition encoded data to produce combined data includes compensating for the effect of each sub channel.

12. A method of receiving data over a wireless channel as recited in claim 6 wherein the repetition encoded data is repeated in the frequency domain on subchannels and wherein combining the repetition encoded data to produce combined data includes weighting data received on different subchannels according to the quality of the subchannels.

13. A method of receiving data over a wireless channel as recited in claim 6 wherein the repetition encoded data is repeated in the frequency domain on subchannels and wherein an aggregate channel quality estimation is made for bits included in the combined data and wherein the aggregate channel quality estimation is used by the Viterbi to determine a maximum likely transmitted data sequence.

14. A method of receiving data over a wireless channel as recited in claim 6 further including estimating a phase offset using the received repetition encoded data.

15. A method of receiving data over a wireless channel as recited in claim 6 further including estimating a phase offset using the received repetition encoded data by making a hard decision and determining a hard decision corrected signal.

16. A method of receiving data over a wireless channel as recited in claim 6 further including:
    estimating a phase offset using the received repetition encoded data by making a hard decision and determining a hard decision corrected signals; and
    filtering the estimated phase offset using a median filter.

17. A system for encoding data for transmission over a wireless channel comprising:
    a convolutional encoder configured to convolutionally encode data to be transmitted over the wireless channel; and
    a repetition encoder configured to repetition encode the convolutionally encoded data, wherein repetition encoding is performed in the frequency domain prior to processing by an Inverse Fast Fourier Transform (IFFT);
    a masker configured to mask the repetition encoded data using a long symbol associated with IEEE 802.11 IEEE 802.11 standard a or IEEE 802.11 standard g;
    the IFFT configured to process the masked data, wherein frequency domain information is transformed into time domain information; and
    a transmitter configured to transmit the time domain information over the wireless channel.

18. A system for encoding data as recited in claim 17 further including an interleaver.

19. A system for encoding data as recited in claim 17 further including a masking processor configured to superimpose a pseudorandom mask on the repetition coded data.

20. A system for receiving data over a wireless channel comprising:
    a receiver configured to receive masked, convolutionally encoded, and repetition encoded data via the wireless channel;

an unmasker configured to unmask the received masked, convolutionally encoded, and repetition encoded data using a long symbol associated with IEEE 802.11 IEEE 802.11 standard a or IEEE 802.11 standard g;

a Fast Fourier Transform (FFT) configured to process the unmasked data, wherein time domain information is transformed into frequency domain information;

a data combiner configured to combine the repetition encoded data to produce combined data, wherein combining is performed in the time domain after processing by the FFT; and a decoder configured to decode the combined data.

21. A system for receiving data as recited in claim 20 further including a deinterleaver configured to deinterleave the combined data.

22. A system for receiving data as recited in claim 20 wherein the decoder is a Viterbi decoder.

23. A system for receiving data as recited in claim 20 further including a mask remover.

24. A system for receiving data as recited in claim 20 further including a phase offset processor configured to determine a phase offset by making a hard decision and determining a hard decision corrected signals.

* * * * *